United States Patent [19]

Moss et al.

[11] 3,968,300

[45] July 6, 1976

[54] PHENOLIC POLYMER, RELATED PRODUCTS AND PROCESSES THEREOF

[75] Inventors: Ernest K. Moss; John H. Beale, both of St. Petersburg, Fla.

[73] Assignee: The Celotex Corporation, Tampa, Fla.

[22] Filed: Feb. 24, 1975

[21] Appl. No.: 552,379

[52] U.S. Cl. ............................. 428/310; 260/2.5 F; 428/313; 428/314; 428/315; 428/321; 428/322
[51] Int. Cl.² .......................................... B32B 3/26
[58] Field of Search ................. 260/2.5 F; 428/310, 428/313, 314, 315, 321, 322

[56] References Cited

UNITED STATES PATENTS

| | | | |
|---|---|---|---|
| 3,639,303 | 2/1972 | Penfold | 260/2.5 F |
| 3,876,620 | 4/1975 | Moss | 260/2.5 F |

*Primary Examiner*—William J. Van Balen
*Attorney, Agent, or Firm*—James W. Grace; David R. Murphy

[57] ABSTRACT

Certain phenolic cellular materials of low thermal conductivity can be produced by having in the cells of the cellular material a synergistic mixture of trichlorofluoromethane and 1,1,2-trichloro-1,2,2-trifluoroethane in a molar ratio of 1:20 to 20:1.

17 Claims, 3 Drawing Figures

THERMAL CONDUCTIVITY (k) BTU-inch/hr-°F-Sq.ft.

MOLE PERCENT OF TRICHLOROFLUOROMETHANE BASED ON TOTAL MOLES OF TRICHLOROFLUOROMETHANE AND 1,1,2-TRICHLORO-1,2,2-TRIFLUORO-ETHANE

PHENOLIC POLYMER, RELATED PRODUCTS AND PROCESSES THEREOF

Phenolic polymers have been known for decades. More recently there has been increased interest in phenolic polymers which can be formed into cellular materials more commonly referred to as foams. See for example Thomas et al. U.S. Pat. No. 2,744,875 (1956); Nelson Canadian Patent No. 674,181 (1963); Dijkstra Canadian Patent No. 684,388 (1964); Wissenfels et al. Canadian Patent No. 866,876 (1971); United Kingdom Patent Specification No. 598,642 (1948); and Australian Patent No. 128,508 (1945). A number of the cellular materials described in these and in other patents exhibit advantageous properties of compresive strength, and low flammability. However, most known cellular materials produced from phenolic polymers exhibit an undesirably high thermal conductivity. Penfold, U.S. Pat. No. 3,639,303, does disclose a foam with a low conductivity. However, that foam is lacking in other desirable properties.

Accordingly, it is an object to provide an improved phenolic cellular material of low thermal conductivity.

Another object is to provide an improved process for producing such cellular materials and an improved laminated building panel employing phenolic polymers.

A further object is to provide an improved phenolic polymer which, when formed into a cellular material, exhibits low friability without adversely affecting compressive strength or its low flammability character and has low thermal conductivity.

Additional objects and advantages of the present invention will be apparent to those skilled in the art by reference to the following detailed description and drawings wherein.

Figure 1:
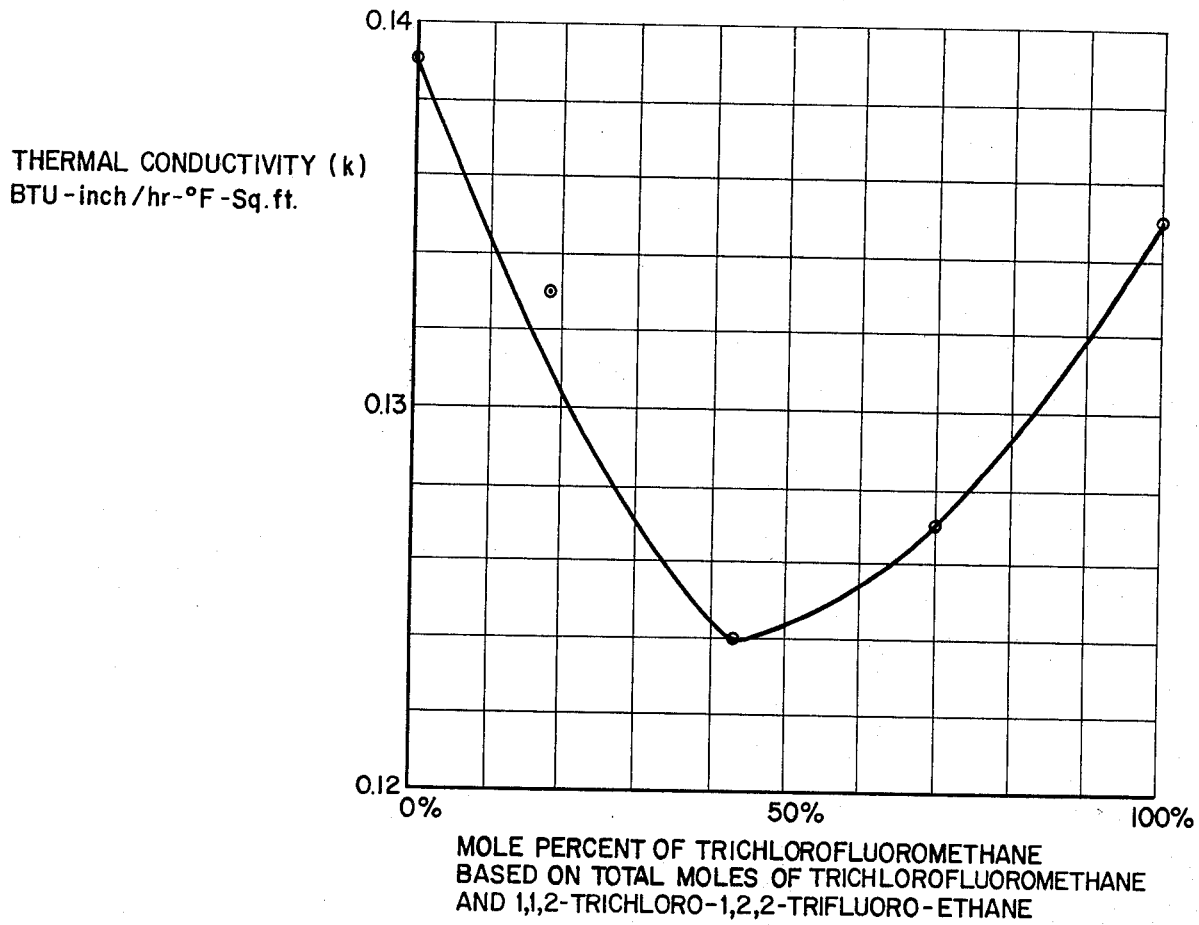
FIG. 1 is a graph of thermal conductivity of certain cellular materials of the present invention.

According to the present invention it has been discovered that employing a synergistic mixture of trichloro-fluoromethane and 1,1,2-trichloro-1,2,2-trifluoro-ethane as the blowing agent in the production of cellular materials from phenolic polymers gives a foam which has a lower thermal conductivity than one produced by the use of either singular blowing agent above.

While the invention is broadly applicable to any phenolic polymer, employing the following type of phenolic polymer gives the optimum advantageous embodiment of the present invention. Such phenolic polymers are those of Formula I:

(I) 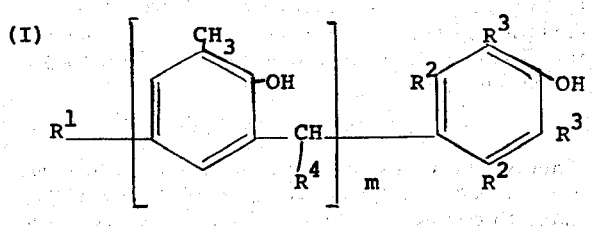

wherein $R^1$ is

hydrogen, or a radical of Formula II:

(II) 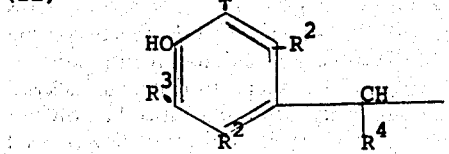

The $R^2$'s are independently selected from the group consisting of lower alkyl, phenyl, benzyl, halo, nitro, and hydrogen. The $R^3$'s are independently selected from the group consisting of $$HOCH-\atop R^4$$

hydrogen, or a radical of Formula II.

The $R_4$'s are independently selected from the group consisting of lower alkyl, hydrogen, phenyl, benzyl, or furyl. By furyl is meant the radical introduced by the use of furfural. In Formula I, $m$ is an integer from 2 to 10 inclusive and is preferably an integer from 2 to 6 inclusive. The phenolic polymers of the present invention generally have a molecular weight between 200 and 2,000 and preferably have a molecular weight between 300 and 1500.

A preferred subclass of phenolic polymers are those of Formula III:

(III) 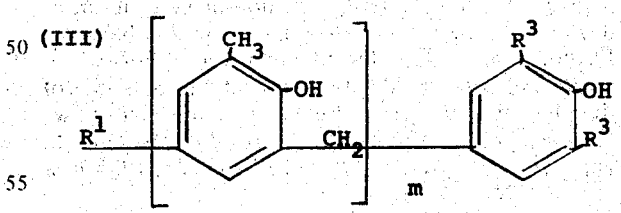

In Formula III, $R^1$ is $HOCH_2-$, or a radical of Formula IV:

(IV) 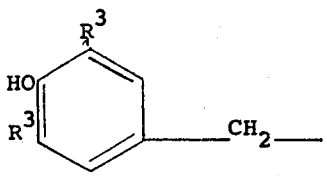

The R³'s are independently selected from the group consisting of HOCH₂—, hydrogen, or a radical of Formula IV.

In a preferred embodiment of the present invention, at least one of the R³'s is methylol, i.e. HOCH₂—. This is to ensure that there will be cross-linking sites on the phenolic polymer. Of course, such methylol groups or, when the aldehyde is other than formaldehyde, alkylol groups, are automatically introduced into the polymer as is well known in the art by the process described below.

In the broadest aspects of the present invention, the phenolic polymer can contain widely varying ratios of the radicals of Formula II or IV to ortho-cresol units. However, this ratio is generally from 1:3 to 3:1 and is preferably from 1:15 to 1.5:1. At lower ratios, i.e., a deficiency of radicals of Formula II or IV, the resultant cellular product tends to be too soft, probably by virtue of decreased cross-linking, whereas at higher ratios, i.e., deficiency of ortho-cresol, the cellular material produced from such a phenolic polymer, tends to be too friable. In determining the above ratios, one must include the radicals of Formula II or IV present in Formula I or III respectively.

Phenolic compositions useful in the present invention comprise the phenolic polymer of Formula I or Formula III, together with a compound of Formula V:

(V) 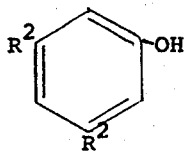

The compound of Formula V can be present in the phenolic composition in widely varying ratios but is generally present in a weight ratio of 1:30 to 1:2 and is preferably present in a weight ratio of 1:20 to 1:5. Exaples of suitable compounds of Formula V include among others: m-cresol, m-chlorophenol, m-nitrophenol, 3,5-xylenol, and phenol, i.e., hydroxy benzene. Phenol is the most preferred compound of Formula V because of cost, availability, and reactivity. Synthesis of the phenolic polymers and phenolic compositions useful in the present invention is described in detail in U.S. application Ser. No. 354,636 filed Apr. 26, 1973 now U.S. Pat. No. 3,876,620.

CELLULAR MATERIAL

The cellular material of the present invention is formed by simply reacting the alkylol group containing phenolic polymer of Formula I or Formula III and the compound of Formula V under conditions such that a cellular product will result. The reaction must be conducted in the presence of a foaming catalyst, a blowing agent, and a surfactant. The cellular materials of the present invention can have a thermal conductivity, $k$ value, of from 0.1 to 1.0 and most usually from 0.1 to 0.15 BTU-inch/Hr-°F-sq. ft. By employing a synergistic mixture of trichloro-fluoromethane and 1,1,2-trichloro-1,2,2-trifluoro-ethane the thermal conductivity values, $k$, for the cellular materials can be kept below 0.135 and can be as low as 0.124. The preferred cellular materials of the present invention have a high degree of closed cells generally over 80% and preferably over 90%. The synergistic blowing agent of the present invention is retained within these closed cells.

FOAMING CATALYST

In the broadest aspects of the present invention, any catalyst which will enhance the cross-linking and foaming reaction can be employed in the present invention. However, the preferred foaming catalysts are aromatic sulfonic acids, examples of which include, among others, benzene sulfonic acid, toluene sulfonic acid and xylene sulfonic acid. The preferred sulfonic acid is a mixture of equal parts by weight of toluene sulfonic acid and yxlene sulfonic acid as described in Mausner et al. U.S. Pat. No. 3,458,449.

The catalyst is generally present in the minimum amount that will give the desired cream times of 10 to 50 seconds and firm times of 40 to 500 seconds to the reacting mixture. The catalyst, however, generally comprises from 0.5 to 20, and preferably comprises from 1.0 to 15, weight percent based on the weight of the cellular material.

THE BLOWING AGENT

Chlorinated and fluorinated hydrocarbons have been suggested and used as blowing agents in making foams. In fact, in the art of making low friable cellular foams, Ser. No. 354,636, Phenolic Polymer, Related Products and Processes Thereof, filed Apr. 26, 1973, trichlorofluoromethane is the preferred blowing agent. However, it is entirely unexpected that a combination of two halogenated hydrocarbons would have a synergistic effect in lowering the thermal conductivity in cellular phenolic foams. This reduction in thermal conductivity makes the cellular material especially useful for insulating structural laminates.

The present invention discloses a synergistic effect with trichlorofluoromethane and 1,1,2-trichloro-1,2,2-trifluoro-ethane. The two components may be employed in molar ratios from 1:20 to 20:1 and preferably from 1:10 to 10:1 and optimally 2:3 to FIG. 1 is a graph of the thermal conductivity, $k$, (BTU-inch/hr-°F-sq. ft.) versus the molar ratio expressed in mole percent of trichlorofluoromethane based on total moles of trichlorofluoromethane and 1,1,2-trichloro-1,2,2-trifluoro-ethane.

The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20, weight percent of the composition. The blowing agents can be maintained and used at ambient temperatures.

THE SURFACTANT

Successful results have been obtained with silicone-/ethylene-oxide/propylene-oxide copolymers as surfactants. Examples of suitable surfactants include, aong others, alkoxy silanes, polysilylphosphonates, polydimethyl siloxane, and polydimethylsiloxane-polyoxyalkylene copolymers.

Examples of specific, commercially available surfactants useful in the present invention include, among others, polydimethylsiloxane-polyoxyalkylene block copolymers available from the Union Carbide Corporation under the tradename "L-5420" and "L-5340". A surfactant known as "74LK6" from Air Products is preferred.

The surfactant generally comprises from 0.05 to 10, and preferably comprises from 0.1 to 6, weight percent of the phenolic composition. Non-ionic surfactants are generally preferred.

Figure 2:
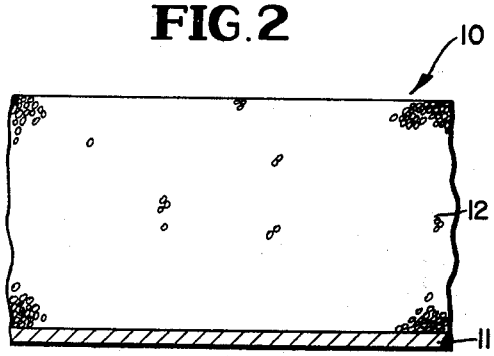
FIG. 2 is a cross-sectional view of a laminated building panel having one facing sheet.
Figure 3:
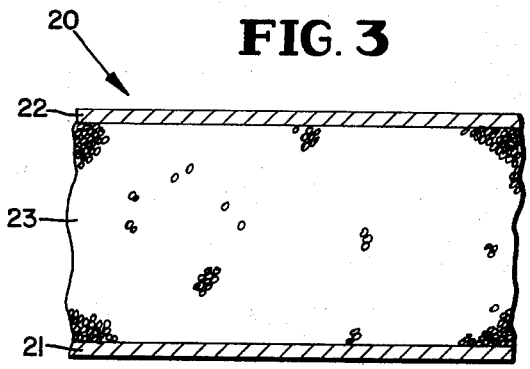
FIG. 3 is a cross-sectional view of a laminated building panel having two facing sheets.

Referring now to the drawings, and in particular to FIG. 2, there is shown a laminated building panel 10 of the present invention. The building panel 10 comprises a single facing sheet 11 having thereon a cellular material 12 of the present invention. FIG. 3 shows a building panel 20 having two facing sheets 21 and 22 on either side of a cellular material 23.

Any facing sheet previously employed to produce building panels can be employed in the present invention. Examples of suitable facing sheets include, among others, those of kraft paper, aluminum, and asphalt impregnated felts, as well as laminates of two or more of the above.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

Example 1 is illustrative of making phenolic polymers of low friability. Compositions of Example 1 are employed in examples 2–6 in the making of cellular materials. Low friability is also a desirable property in low thermal conducting structural laminates.

EXAMPLE 1

This example is illustrative of the synthesis of phenolic polymers useful in the present invention.

The following quantities of the following ingredients are combined as illustrated.

| Item | Name | Quantity Grams | Gram-Moles |
|---|---|---|---|
| A | ortho-cresol | 1568 | 14.5 |
| B | HCHO (93.6% paraformaldehyde) | 707 | 21.7 |
| C | NaOH (50% solution) | 29.2 | 0.365 |
| D | HCHO | 377 | 11.6 |
| E | phenol | 1364 | 14.5 |
| F | acetic acid | 24 | 0.4 |

Items A, B, and C are reacted at 100°C for 1.5 hours in Step I to form a mixture. In Step II, items D and E are added to the mixture of Step I and the temperature is maintained at 80°C for 3.5 hours. Then Item F is added to neutralize to a pH of 5.0 to 7.0 and the reaction products are cooled to room temperature.

The items are calculated to be present in the following molar ratios:

| | |
|---|---|
| phenol: o-cresol | 1:1 |
| sites ratio | 1:0.5 |
| HCHO: o-cresol, Step I | 1.5:1 |
| NaOH: (phenol + o-cresol) | 1:80 |

The reaction products produced above had a viscosity of 39,500 centipoises at 25°C and constitute a phenolic composition of the present invention which analyzes as follows:

| | | |
|---|---|---|
| phenol | 9.6 | weight percent |
| cresol | 0 | weight percent |
| formaldehyde | 0.92 | weight percent |
| water | 9.7 | weight percent |
| phenolic polymer | balance | |

EXAMPLE 2

This example illustrates the optimum $k$ value using the polymer of Example 1 and the following ingredients to make a cellular material.

| Item | Ingredients Name | Quantity grams |
|---|---|---|
| A | phenolic polymer of Ex. 1 | 80 |
| B | phenol | 11 |
| C | catalyst B | 13 |
| D | trichlorofluoromethane (3.6 g.) and 1,1,2-trichloro-1,2,2-trifluoro-ethane (6.4 g.) | 10 |
| E | Surfactant 74LK6 | 5 |
| F | Water | 9 |

Items A through F are mixed in an open vessel whereupon a reaction ensues. The reaction products produce a foam which is cured in an oven at 45° to 70°C. Several hours later the friability and thermal conductivity are determined and recorded in Table I. Items A, B, and F are added together in the form of (100 g) of the phenolic composition of Example 1. In Item D the trichlorofluoromethane and 1,1,2-trichloro-1,2,2-trifluoro-ethane area in a molar ratio of 4.3:5.7.

EXAMPLES 3–6

Examples 3, 4, 5 and 6 employ the same composition of ingredients as Example 2 with the single exception of varying the molar ratio of trichlorofluoromethane and 1,1,2-trichloro-1,2,2-trifluoro-ethane. Table I gives a tabulation of the amount of blowing agents employed and shows the thermal conductivity in tabular form. FIG. 1 of the drawing shows the data graphically.

TABLE I

| Example | Moles A/A+B *100 (%) | k BTU-in hr °F sq ft | Friability ASTM C-421 (%) |
|---|---|---|---|
| 2 | 43 | .124 | 23 |
| 3 | 19 | .133 | 21 |
| 4 | 0 | .139 | 19 |
| 5 | 70 | .127 | 30 |
| 6 | 100 | .135 | 38 |

*where A = trichlorofluoromethane B = 1,1,2-trichloro-1,2,2-trifluoro-ethane

EXAMPLE 7

This example illustrates the synthesis of a foaming catalyst useful in the present invention.

The following quantities of the following ingredients are combined as indicated to produce Catalyst B:

| Item | Ingredients Name | Quantity grams |
|---|---|---|
| A | Ultra TX | 667 |
| B | water | 333 |

Items A and B are mixed. The resultant composition is termed Catalyst B. Ultra TX is a mixture of equal parts by weight of p-toluene sulfonic acid and xylene sulfonic acids available from the Witco Chemical Company.

EXAMPLE 8

The phenolic composition of Example 2 is spread on a paper facing sheet and produces the laminated panel 10 of FIG. 2.

EXAMPLE 9

The phenolic composition of Example 2 is placed between two facing sheets each comprising an asphalt impregnated felt commonly used as a roofing membrane and produces the laminated panel 20 of FIG. 3.

EXAMPLE 10

This example is not illustrative of the synthesis of phenolic polymers useful in the present invention. Rather it shows the synthesis of a phenolic polymer of Penfold (U.S. Pat. No. 3,639,303).

The following quantities of the indicated ingredients were combined as described.

| Item | Name | Quantity Grams | Gram-Moles |
|---|---|---|---|
| A | Phenol | 466 | 4.86 |
| B | 4,4'-bis (chloromethyl) diphenyl ether | 260 | 0.98 |
| C | Zinc chloride | 7 | 0.0514 |
| D | Paraformaldehyde | 235 | 7.24 |

Components (A) and (C) were combined in a 1-liter polymerization kettle. Component (B) was added over a period of 45 minutes. The temperature was kept under 50°C. After the addition was complete, the temperature was raised to 60°–65°C to expel the remaining HCl. The reaction mixture was then cooled to 40°C and adjusted to a pH of 7 to 7.5 with 20% NaOH. An additional 3.5 g of NaOH was added to raise the pH to 8. Component D was introduced together with 130 ml of water. The temperature was maintained at 90°C during the ensuing exothermic reaction. After completion of the exothermic reaction the product was cooled to 26°C. The Brookfield viscosity was 240 cp. A total of 137 g of water was removed from the product yielding a homogeneous fluid having a viscosity of 2000 cp at 23°C.

A replicate preparation was made identically except for stripping off 166.5 g of water. Analysis showed the replicate product contained 14.8%-free formaldehyde and 21.4% water. This leads to the conclusion that 42% of the formaldehyde reacted. The phenol content was 9.6%.

This product is termed the Penfold composition and is used in Example 11.

EXAMPLE 11

This example illustrates the undesirable properties possessed by a cellular material employing the resin composition of Penfold produced in Example 10.

| Item | Ingredients Name | Quantity |
|---|---|---|
| A | Resole of Example 10 | 200 grams |

| Item | Ingredients Name | Quantity |
|---|---|---|
| B | Surfactant DC-193 | 5 grams |
| C | Blowing agent: | |
| | fluorotrichloromethane | 8.5 grams |
| | 1,1,2-trichloro-1,2,2,trifluoro-ethane | 17.0 grams |
| D | 50/50 HCl(sp. g. 1.18)/water | 22 ml. |

Components A, B, and C were blended in a high-speed mixer until they formed a smooth emulsified liquid. The weight was checked to ascertain that all the fluorocarbon was still present. Item D was quickly added with stirring. After mixing at high speed for about 15 seconds the liquid mass was poured into a cardboard box. After standing at room temperature (27°C) for 5 minutes, the foam rose slightly. After 10 minutes the reacting mass was placed in an oven for 16 hours at 55°C.

The resultant foam was analyzed and gave the following results:

Density: 4.05 pounds per cubic foot
Closed Cell Content: 86% (ASTM D 2856-70)
Friability: 69% (ASTM C-421)

This foam, although it exhibits a high closed cell content, has an extremely long reaction time and an unacceptably high friability. A 69% friability at a foam density of 4 pcf is commercially unacceptable. Furthermore, it indicates that the friability would be even higher at a more economically feasible density of 2 or 3 pcf.

The site ratio is defined as the quantity (2 times the moles of o-cresol plus 3 times the moles of compound of Formula V) all divided into the moles of aldehyde. The site ratio is normally expressed as a ratio, i.e. 1:0.40, rather than as a fraction, i.e. 1/0.40, or as a whole number, i.e. 2.5. This ratio means "moles sites: moles aldehyde".

Although the invention has been described in considerable detail with reference to certain preferred embodiments thereof, it will be understood that variations and modifications can be effected within the spirit and scope of the invention as described above and as defined in the appended claims.

What is claimed is:

1. A cellular material comprising the reaction product of:
   A. an alkylol group containing phenolic polymer of Formula I:

(I)

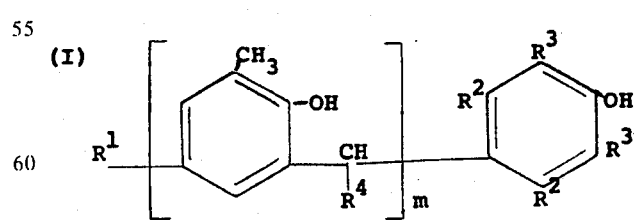

wherein:

a. $R^1$ is

hydrogen or a radical of Formula II:

(II)

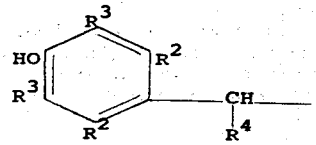

b. the $R_2$'s are independently selected from the group consisting of lower alkyl, phenyl, benzyl, halo, nitro and hydrogen,
c. the $R^3$'s are independently selected from the group consisting of

hydrogen, or a radical of Formula II,
d. the $R^4$'s are independently selected from the group consisting of lower alkyl, hydrogen, phenyl, benzyl, or furyl,
e. $m$ is an integer from 2 to 10 inclusive,
f. the phenolic polymer has a molecular weight between 200 and 2000, and
B. a compound of Formula V:

(V)

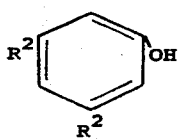

wherein the weight ratio of B:A is 1:30 to 1:2.
C. trichlorofluoromethane and 1,1,2-trichloro-1,2,2-trifluoro-ethane in a molar ratio of 1:20 to 20:1.

2. A cellular material of claim 1 wherein the molar ratio of trichlorofluoromethane to 1,1,2-trichloro-1,2,2trifluoro-ethane is 1:10 to 10:1.

3. A cellular material of claim 1 wherein the molar ratio of trichlorofluoromethane to 1,1,2-trichloro-1,2,2-trifluoro-ethane is 2:3 to 3:2.

4. The cellular material of claim 1 having a bulk density of 1 to 5 pounds per cubic foot.

5. The cellular material of claim 1 having a thermal conductivity value ($k$) of from 0.1 to 1.0 BTU-inch/hr-°F-sq. ft.

6. The cellular material of claim 1 having a thermal conductivity value ($k$) of from 0.12 to 0.14 BTU-inch/hr°F-sq. Ft.

7. The cellular material of claim 1 wherein the reaction product further comprises a foaming catalyst.

8. The cellular material of claim 6 wherein the foaming catalyst is an aromatic sulfonic acid.

9. The cellular material of claim 2 wherein the aromatic sulfonic acid is equal parts of p-toluene sulfonic acid and xylene sulfonic acid.

10. The cellular material of claim 1 wherein the blowing agent comprises from 1 to 30 weight percent based on the weight of the cellular material.

11. The cellular material of claim 1 wherein the reaction product further comprises a surfactant.

12. The cellular material of claim 11 wherein the surfactant is nonionic.

13. A cellular material comprising the reaction product of:
A. a methylol group containing phenolic polymer of Formula III:

(III)

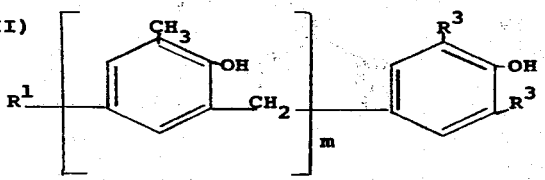

wherein:
a. $R^1$ is $HOCH_2-$, hydrogen or a radical of Formula IV:

(IV)

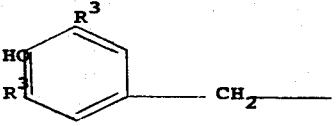

b. the $R_3$'s are independently selected from the group consisting of $HOCH_2-$, hydrogen or a radical Formula IV,
c. $m$ is an integer from 3 to 6 inclusive,
d. the phenolic polymer has a molecular weight between 300 and 1500, and
B. phenol, wherein the weight ratio of B:A is 1:20 to 1:5,
C. a blowing agent which is a mixture of trichlorofluoromethane and 1,1,2-trichloro-1,2,2-trifluoro-ethane in the molar ratio of 3:2 to 2:3 and present in an amount from 1 to 30 weight percent based on the weight of cellular material.
D. a foaming catalyst,
E. a surfactant.

14. A process for producing a cellular material comprising the step of admixing:
A. a methylol group containing phenolic polymer of Formula III:

(III) 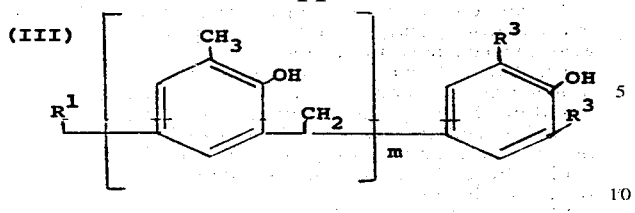

wherein:
a. $R^1$ is $HOCH_2-$, hydrogen or a radical of Formula IV:

(IV) 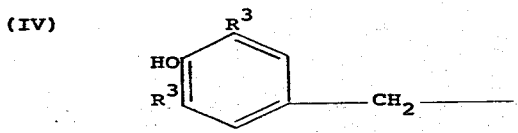

b. the $R_3$'s are independently selected from the group consisting of $HOCH_2-$, hydrogen or a radical of Formula IV,
c. $m$ is an integer from 3 to 6 inclusive,
d. the phenolic polymer has a molecular weight between 300 and 1500, and
B. phenol, wherein the weight ratio of B:A is 1:20 to 1:5,
C. a foaming catalyst,
D. a blowing agent which is a combination of trichlorofluoromethane and 1,1,2-trichloro-1,2,2-trifluoro-ethane in the molar ratio of 3:2 to 2:3 and 1 to 30 weight percent based on the weight of cellular materials,
E. a surfactant.

15. A process of claim 14 wherein the molar ratio of trichlorofluoromethane to 1,1,2-trichloro-1,2,2-trifluoro-ethane is in the molar ratio of 1:10 to 10:1.

16. A process of claim 14 wherein the molar ratio of trichlorofluoromethane to 1,1,2-trichloro-1,2,2-trifluoro-ethane is the molar ratio of 2:3 to 3:2.

17. A laminated structural panel having at least one facing sheet and having the cellular material of claim 1 adhering thereto.

* * * * *